INVENTORS
GORDON ASHWORTH
JOHN DUNLOP

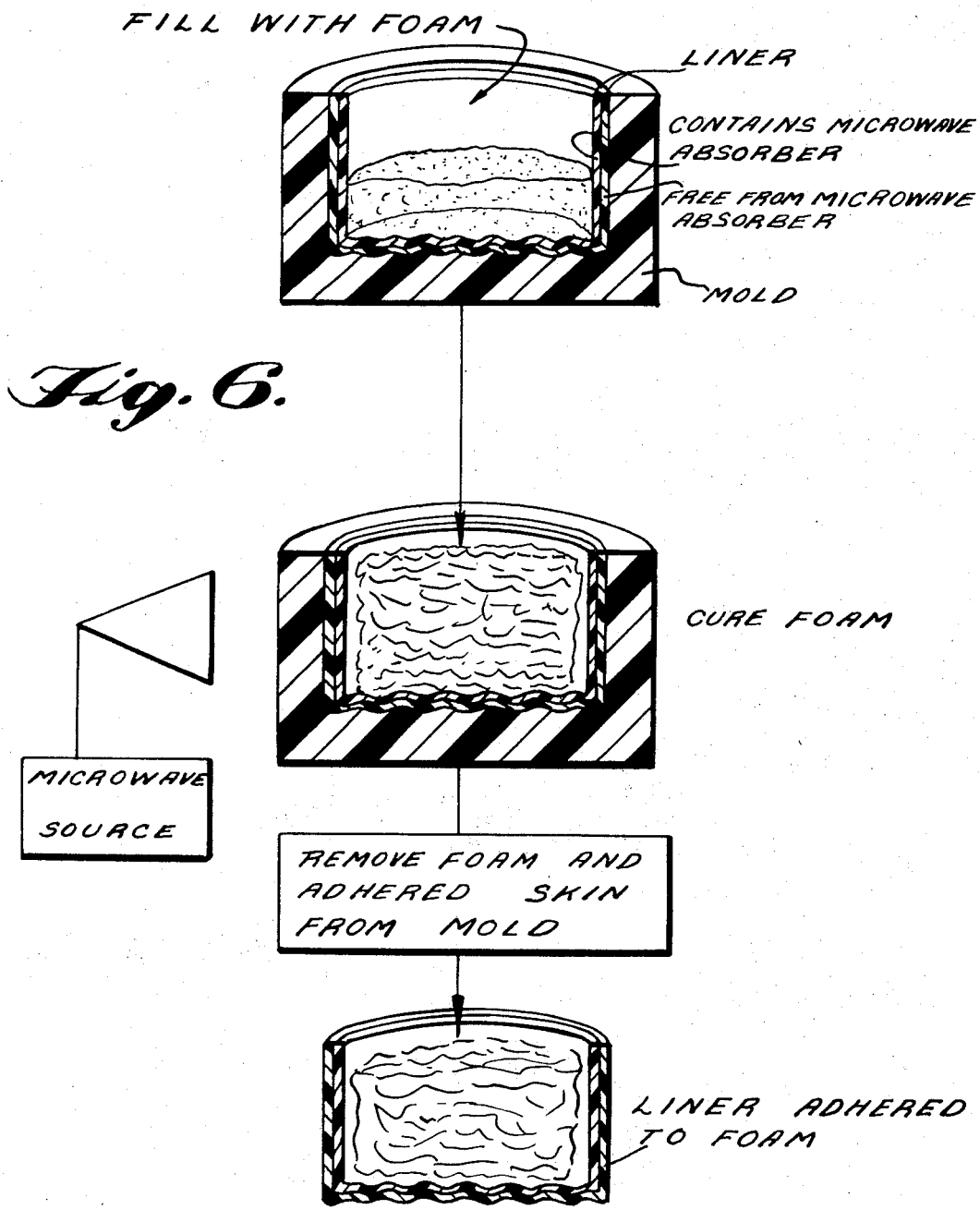

United States Patent Office 3,420,923
Patented Jan. 7, 1969

3,420,923
PROCESS FOR MANUFACTURING FOAMED PLASTIC ARTICLES HAVING OUTER SKIN BY CURING WITH MICROWAVES
Gordon Ashworth and John Dunlop, Hyde, England, assignors to Imperial Chemical Industries Limited, London, England, a corporation of Great Britain
Filed July 27, 1964, Ser. No. 385,272
Claims priority, application Great Britain, July 29, 1963, 29,937/63
U.S. Cl. 264—26        7 Claims
Int. Cl. B29d 9/00

ABSTRACT OF THE DISCLOSURE

A process for curing foamed articles, especially where the foam is polyurethane. The curing is in a mold which is lined with a sheet material which becomes adhered to the foam. The sheet material has incorporated in it a material which absorbs microwave energy. The mold, after filling with foam, is placed in a microwave field. Preferably, the sheet has more than one layer and the absorber is in the layer next to the foam.

---

This invention relates to the curing of polyurethane and other foam materials and in particular to the use of microwave heating in such curing processes.

It has been proposed that foams may be readily cured by means of microwave heating. From the economic point of view both in time, capital and running costs, curing by this technique offers great advantages over conventional methods.

This technique relies on the fact that certain substances readily absorb microwave power, which is converted into heat within the absorbing material. This means that if a suitable substance is put into a beam of microwave radiation (electromagnetic radiation with a wave length of the order of centimeters—or radar waves which are continuous rather than pulsed), then the substance is heated throughout. From the point of view of curing foams this is probably the most important single property of the method. The foam is not heated from the outside, the heat is generated at every point within the material.

The technique is particularly applicable to the manufacture of foamed articles such as cushions, arm rests, crash pads and sun visors, which are used extensively in the automobile industry.

The method adopted has been to make a mould conforming to the shape of the required article and to fill the mould with a foam forming mixture. The mould and its contents are then subjected to microwave heating whereby the moulded article is cured. Where the article involved is thick it has been found that difficulties are experienced with incomplete curing of the article in its exterior regions. This incomplete curing is a result of loss of heat through the mould and consequently unequal heating of the article.

One method of preventing incomplete curing during the microwave heating is to use a mould made from glass fibre-reinforced epoxy resin in which there has been incorporated a metal powder. The use of such a mould prevents heat losses on account of the mould being itself heated up when it is placed in a beam of microwaves. The mould is provided with a lid made from a similarly loaded epoxy resin in order that the article is completely encapsulated during the curing process. In this way heating takes place simultaneously in the foam and in the mould and heat losses are prevented and consequently the article is uniformly cured. While the product obtained by such a method is good, an obvious disadvantage is that the mould is heated up and it is necessary to cool it before it is recharged with a foam forming mixture. Apart from this a "loaded" mould has not been found to be as suitable when it is required to manufacture a foam laminate comprising a foamed article partially covered by a skin of plastic or other sheet material. In such a case the mould is lined with the sheet material by draping or vacuum forming techniques and the lined mould is filled with the foam forming mixture and subsequently cured. The presence of the skin produces inferior curing in the vicinity of the skin during the microwave heating.

We now propose a method of manufacturing from laminates comprising a foamed layer covered at least partially with a skin of thermoplastic or other suitable material which utilises microwave heating during the curing stage and which is not subject to the disadvantages of previous methods.

According to our invention a method of manufacturing a laminate comprising a foamed layer covered at least partially with a skin of thermoplastic or other suitable material consists of lining a mould with the skin, filling the lined mould with a foam forming mixture and placing the mould in a beam of microwave radiation so that the foam is cured and adhesion achieved between the foam and the skin, the skin having incorporated in it an additive which absorbs microwaves so that heat is generated in the skin thereby preventing heat losses from parts of the periphery of the foam layer provided with a skin while the foam is being cured.

The invention is illustrated by the drawings in which—

FIGURE 6 is a flow diagram showing the steps in the process.

Figure 1:
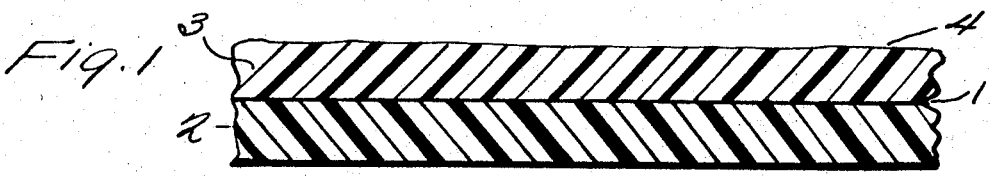
FIGURE 1 depicts an enlarged fragmentary section through a plastic sheet suitable for use with our invention.

The skin may consist of a thermoplastic sheet material which is in the form of an unsupported or supported sheet or alternatively the skin may be made from neoprene, rubber or any other suitable material. It may consist of one or more layers which may be of similar or dissimilar compositions and where there are more than one layer, one or all of the layers may be impregnated with the additive. Thus the skin may include an adhesive layer which may serve to join the layers together or alternatively the adhesive may be used to improve adhesion between the skin and the foamed layer. Where an adhesive is used we have found that it is often convenient to incorporate in this a suitable additive rather than one of the other layers of the skin to produce the desired effect.

Preferably, according to our invention, only that surface layer of the skin which is adjacent to the foamed layer has incorporated in it an additive which absorbs microwaves so that heat is generated in only this surface layer of the skin. It has been found that with this arrangement heat losses from the periphery of the foam may be prevented and yet very little heat is conducted to the mould. As a result of this the mould remains cool and a further moulding operation can be carried out as soon as a previous one has been completed. Thus where a multi-layer skin is used it is preferred that only the layer of skin in immediate contact with the foam is impregnated. When the layer of the skin adjacent to the foam is an adhesive layer, then it is preferred that only the adhesive layer is impregnated.

Any material which has the property of absorbing microwaves with the generation of heat may be used as an additive but such material must of course be compatible with the other constituents of the skin layer involved. Examples of suitable materials are finely divided carbon, finely divided iron powder, finely divided iron oxide, barium sulphate and barium titanate. In the case of iron the form known as "carbonyl iron" is particularly suitable—this form having a particle size in the range 5–7 microns.

The additive is incorporated in the skin or adhesive when it is manufactured. When the additive is incorporated in a skin made from thermoplastic sheet material the additive may be introduced into the plastic composition before the sheet is calendered or spread. Since it is often convenient to calender or spread in two or more stages, a composition which includes the additive may be used in one stage and a composition which does not include the additive may be used in the other stage or stages. In this way only the surface layer of the skin is impregnated.

In a preferred form of our invention the weight of additive in the surface layer is in excess of 0.03 ounce per square foot of surface.

In practice it is usual to provide one of the skin surfaces with an embossed or other pattern and it is usual to use an unloaded layer for this purpose.

Though our invention is applicable to the curing of all foam forming mixtures it is particularly suitable for the curing of polyurethane foams and in conjunction with the manufacture of foamed articles, such articles being covered, at least partially, with a skin of thermoplastic or other sheet material.

Apart from polyurethane foams our invention can conveniently be used to improve the curing of foamable compositions such as polymers of vinyl chloride or vinylidene chloride which are suitably compounded with blowing agents, plasticizers, pigments and other additives and which may further be compounded with other polymeric substances such as nitrile rubber, polyethylene, butadiene styrene resins amongst others.

Examples of suitable thermoplastic materials which may constitute the skin are polymers of vinyl chloride or vinylidene chloride; these may be suitably compounded with plasticizers and pigments and which may further be compounded with other polymeric substances such as nitrile rubber, polyethylene, acrylonitrile, butadiene styrene resins amongst others.

To achieve our invention a mould conforming to the shape of the required article is made from, for example, glass fibre reinforced epoxy resin. Into this is draped, shaped or vacuum formed, a skin of "loaded" thermoplastic or other suitable material such that it conforms closely to the mould surface and thus forms a lining for the mould. The lined mould is filled with a foam forming mixture and placed in a microwave oven. The foam is quickly cured with the exception of regions near surfaces which are not provided with a loaded skin. To ensure that such regions are also fully cured the mould may be provided with a "loaded" lid. This lid is closed during the curing stage and heat losses in the direction of the lid are prevented.

It will thus be realised that with our invention the body of the mould used will not be heated up excessively during the curing operation. This is a useful advantage of our method as with previous methods the mould has needed to be cooled considerably before the mould can be used again.

The invention is now illustrated but not limited by the following example in which all parts are by weight.

EXAMPLE

A car seat mould was made from glass fibre-reinforced epoxy resin and was provided with a lid such that when the lid was in the closed position the inside of the mould was completely enclosed. The lid was also made from glass fibre reinforced epoxy resin but was impregnated with carbonyl iron having a particle size in the range 5 to 7 microns. The approximate ratio of carbonyl iron to epoxy resin in the impregnated lid was 40 parts to 100 parts.

A plastic sheet comprising a two layer laminate was now vacuum formed into the open mould. One layer of the plastic laminate had the following composition:

| | Parts |
|---|---|
| Polyvinyl chloride polymer | 100 |
| Plasticiser | 60 |
| Carbonyl iron | 40 | together with other minor ingredients such as pigments or stabilisers. The thickness of the layer was approximately 0.002 in. The weight of additive in this layer was approximately 0.06 ounce/sq. ft. The other layer of the two layer laminate had the following composition:

| | Parts |
|---|---|
| Polivinyl chloride polymer | 100 |
| Plasticiser | 60 | together with other normal ingredients such as pigments or stabilisers. The thicknes of this layer was approximately 0.015 in. The exposed surface of this layer was provided with an embossed pattern.

The position of the sheet in the mould was such that the layer which did not incorporate carbonyl iron was adjacent to the mould.

The lined mould was now filled with a polyurethane foam forming mixture which included such ingredients as organic polyisocyanates, organic polyhydroxy compounds and water. In such a mixture the water reacts with the polyisocyanate forming carbon dioxide gas which is trapped within the polymeric mass thus producing a cellular material.

The mould lid was placed in position and the sealed mold was placed in a microwave oven the frequency of which was 2,450 megacycles which was equivalent to a wave length of 12.5 cms. The mold was taken out of the oven after five minutes and the moulded article removed. The foam was fully and evenly cured and good adhesion was made between the plastic sheet and the foam layer. The exposed surface of the plastic sheet had retained its embossed pattern.

The two layer laminate could equally well have been made with the layer which will be adjacent to the foam layer having either of the following compositions:

Composition 1

| | Parts by weight |
|---|---|
| Polyvinyl chloride polymer | 100 |
| Barium sulphate | 100 |
| Di-alphanyl phthalate | 100 | together with other minor ingredients such as pigments or stabilizers.

Composition 2

| | Parts by weight |
|---|---|
| Polyvinyl chloride polymer | 100 |
| Carbon black | 20 |
| Di-alphanyl phthalate | 60 | together with other minor ingredients such as pigments or stabilizers.

In FIGURE 1 the plastic sheet 1 consists of two layers 2 and 3. Layer 2 incorporates a microwave heat sensitive additive such that when the sheet is subsequently heated by microwave means the layer 2 is heated. Layer 3 is made from a normal plastic composition and is provided with for example, an embossed surface 4.

Figure 2:
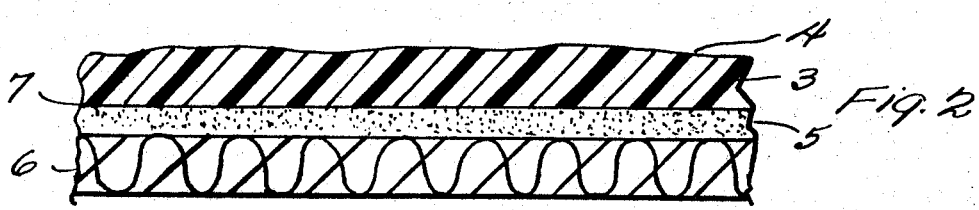
FIGURE 2 depicts an enlarged fragmentary section of another form of plastic sheet suitable for use with our invention.

In FIGURE 2 an alternative form of plastic sheet consists of an embossed sheet of plastic material 3 attached to a textile or other substrate 6 by means of an adhesive layer 7. In this particular case the adhesive is impregnated with an additive which is heat sensitive to microwaves such that when the sheet is subsequently heated the adhesive layer and consequently the sheet is heated up.

Figure 3:
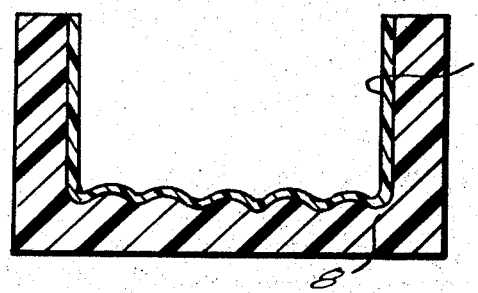
FIGURE 3 shows a section through a mold into which has been draped or vacuum formed the sheet depicted in FIGURE 1.

In FIGURE 3 the plastic sheet depicted in FIGURE 1 has been draped or vacuum formed inside a suitable mold 8 in such a manner that the layer 3 (see FIGURE 1) is in contact with the mold.

Figure 4:
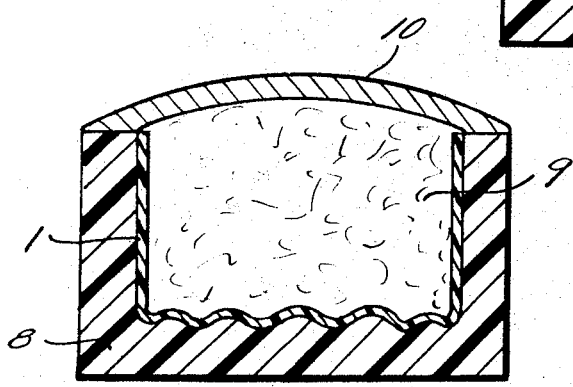
FIGURE 4 shows a section through the mold as placed in the microwave oven.

In FIGURE 4 is seen a section through the enclosed mold as placed in the microwave oven. The lined mold as depicted in FIGURE 3 has been filled with a foam forming mixture 9 and then covered by a lid 10. The lid is "loaded" with a microwave heat sensitive additive such that it is heated when the mold and its contents are subjected to microwave heating—in this way heat losses are reduced or prevented through the lid during the curing stage.

Figure 5:
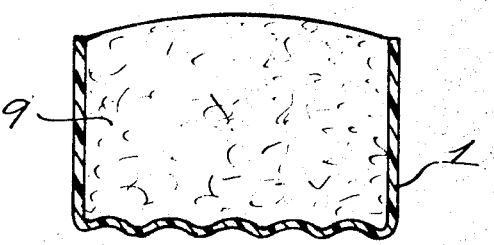
FIGURE 5 shows a section through a foamed laminated article made according to our invention.

In FIGURE 5 is shown a section through a product made according to our invention. The foam layer is fully cured and good adhesion is apparent between the foam and the plastic skin 1.

What is claimed is:

1. In a method of molding an article of foamed plastics material covered at least partially with a skin of a plastics material which comprises lining a mold with the skin, introducing the requisite quantity of a foam forming mixture into the lined mold allowing said foam forming ingredients to foam and substantially fill said mold and then subjecting the mold to a beam of microwave radiation to cure the foamed plastics material and achieve adhesion between the foam and the skin; the improvement comprising incorporating in the skin an additive which absorbs microwaves so that heat is generated in the skin, thereby preventing heat losses during curing from those parts of the molded foam material provided with a skin, the mold being transparent to microwaves and therefore not heated by microwave absorption so that it need not be cooled prior to reusing it.

2. A method of manufacturing a laminate as claimed in claim 1 in which the said skin consists of more than one layer.

3. A method of manufacturing a laminate as claimed in claim 2 in which only one layer has incorporated in it an additive which absorbs microwaves so that heat is generated in the layer.

4. A method as claimed in claim 3 in which only the layer of skin which is adjacent to the foamed layer has incorporated in it an additive which absorbs microwaves.

5. A method as claimed in claim 4 in which the layer of the skin which is adjacent to the foamed layer is an adhesive which serves to aid adhesion between the skin and the foamed layer.

6. A method as claimed in claim 4 in which the weight of additives in the surface layer is in excess of 0.03 ounce per square foot of the surface.

7. A method of manufacturing a laminate as set forth in claim 1 in which said additive is at least one material from the group consisting of carbon, iron powder, iron oxide, barium sulphate or barium titanate.

References Cited

UNITED STATES PATENTS

| 2,423,902 | 7/1947 | Peterson | 264 |
| 2,855,021 | 10/1958 | Hoppe | 264—45 |
| 3,209,056 | 9/1965 | Jacobs | 264—45 |
| 3,253,064 | 5/1966 | Bnonaiuto | 264—26 |

OTHER REFERENCES

Microwave Curing of Flexible Polyurethane Foam Molding, Lanigan, W. J., in British Plastics, October 1963.

Du Pont Bulletin, Elastomer Chemical Dept., June 1957, Rigid Urethane Foams, Methods of Application.

JULIUS FROME, Primary Examiner.

P. E. ANDERSON, Assistant Examiner.

U.S. Cl. X.R.

264—45, 54, 269, 338; 260—2.5